US005737761A

United States Patent [19]

Holland et al.

[11] Patent Number: 5,737,761

[45] Date of Patent: Apr. 7, 1998

[54] MEMORY CONTROL ARCHITECTURE FOR HIGH-SPEED TRANSFER OPERATIONS

[75] Inventors: Stephen Holland; Gregory L. Tucker, both of Boise, Id.

[73] Assignee: Micron Technology, Inc., Boise, Id.

[21] Appl. No.: 662,851

[22] Filed: Jun. 12, 1996

Related U.S. Application Data

[63] Continuation of Ser. No. 360,865, Dec. 20, 1994, Pat. No. 5,623,624, which is a continuation of Ser. No. 12,094, Feb. 1, 1993, abandoned.

[51] Int. Cl.$^6$ .......... G06F 12/02

[52] U.S. Cl. .......... 711/165; 395/523; 395/436; 395/432; 395/525; 711/109; 711/105

[58] Field of Search .......... 395/523, 436, 395/432, 525, 492

[56] References Cited

U.S. PATENT DOCUMENTS 5,475,631 12/1995 Parkinson et al. .......... 395/800.15
5,555,429 9/1996 Parkinson et al. .......... 395/800.14
5,581,733 12/1996 Toda .......... 395/492

*Primary Examiner*—William M. Treat
*Assistant Examiner*—Kenneth R. Coulter
*Attorney, Agent, or Firm*—Trask, Britt & Rossa

[57] ABSTRACT

A subsystem architecture for direct memory access of random access memory (RAM) which performs block transfers of adjacent units of memory from one memory location to another. The architecture comprises a RAM array with write enable capability, serial access memory (SAM) registers, an alignment unit, and controller. An embodiment is described which performs bit-block transfers (BitBLTs) of pixel data within a graphical user interface (GUI) subsystem which utilizes Triple-ported Dynamic RAM (TPDRAM). The BitBLT is broken up into four cycles which handle the transfer of all possible combinations of units of adjacent memory utilizing the entire bandwidth of the port writing to RAM. The architecture allows operations to be pipelined.

32 Claims, 9 Drawing Sheets

MEMORY CONTROL ARCHITECTURE FOR HIGH-SPEED TRANSFER OPERATIONS

This is a continuation of application Ser. No. 08/360,865, filed Dec. 20, 1994 now U.S. Pat. No. 5,623,624, and a continuation of application Ser. No. 08/012,094, filed Feb. 1, 1993 now abandoned.

FIELD OF THE INVENTION

This invention relates to digital system architecture and, more particularly, to improving the speed of data transfers within random access memory (RAM). A typical application of this invention is accelerating bit-block transfers within a memory array storing pixel data for a graphical user interface subsystem or any other direct memory access type application.

BACKGROUND OF THE INVENTION

Computers and other electronic equipment use random access memory (RAM) to store information. Oftentimes during operation, data in one portion of memory must be written, moved or transferred to another portion. Frequently, this involves large blocks of data. A problem occurs when these transfers impact significantly on the speed with which a system performs.

Nowhere is this problem more apparent than in graphical user interface (GUI) subsystems such as computer screen displays where memory serves as a digital representation of the screen. Changing what appears on the screen involves changing the data in the memory array.

Oftentimes, certain images on the screen are merely being copied from one location in memory and written to another. A bit-block transfer (BitBLT) operation accomplishes the necessary change in memory by reading data from one location of a memory array, and then writing it to another location. Current personal computer software applications such as Microsoft's WINDOWS make extensive use of these types of transfers.

A typical subsystem might serve a screen of 1024×768 pixels, each of which might be represented in memory as an 8-bit color/intensity value. Pixels can in turn be grouped into pixel words, depending on the system architecture. For instance, in a 32-bit machine, four 8-bit pixels may be conveniently grouped into one 32-bit pixel word.

For example, a computer screen is divided into an array or grid of pixels, 768 rows by 1024 columns. The information concerning the color/intensity for each pixel at a given time is stored in a RAM array frame buffer, as shown in FIG. 1, where 8-bit pixels are grouped into pixel-words having 4 pixels per pixel-word.

FIG. 2 shows the upper left portion of the frame buffer memory array wherein each pixel-word is composed of four pixels in adjacent columns. Suppose we wish to transfer pixels C–J from their current position in row 0 to a destination in row 3. Since the architecture deals in pixel-words, a potential problem occurs when the source address of a pixel falls in a different position within a pixel-word than does the destination address. In this case, pixel C shifts from position 2 in its source pixel-word to position 1 in its destination pixel-word.

Another potential problem occurs when the location of the beginning or ending pixel in a block of pixels to be transferred is not on a pixel-word boundary. When the number of pixels being transferred is not divisible evenly by four (i.e. not modulo 4), some part of the block, either the beginning or the end or both, will not fall cleanly on a pixel-word boundary.

The subsystem architecture must be designed to handle all the possible situations which can arise when a block of data to be transferred is not aligned cleanly on pixel-word boundaries. The more complex data manipulations required for these unaligned BitBLT's can further sap system resources.

Since BitBLT's are a significant factor in overall GUI subsystem performance, increasing their speed improves the system.

Current solutions to the problem include the development of several coprocessed graphics cards having a block transfer engine such as the 8514A and XGA, both developed by IBM, Inc., and the S3 Accelerator, developed by S3, Inc.

These solutions utilize only a single port into the RAM array, and therefore both read and write access operations must occur through that port. It would be advantageous to have an architecture which might utilize more than one port in performing memory access operations.

SUMMARY OF THE INVENTION

The principal and secondary objects of this invention are to provide an architecture for performing Bit-block transfers within a RAM array with far greater speed and efficiency over current solutions.

These and other objects are achieved by a RAM array allowing write enables for each unit of interest (pixels in the GUI example), in combination with serial access memories for each data-unit of interest, and a controller. An alignment unit is necessary for accomplishing unaligned transfers. A given transfer is broken up into four cycles which handle all the possible combinations of units of adjacent memory making up the block. Also, operations comprising each of the cycles may be pipelined.

Although development of this invention was initiated by the problems inherent in GUI subsystems, the invention itself accelerates direct memory access operations. As such, this invention may enhance any system which performs these types of operations.

The architecture can be implemented on a single integrated circuit chip or by combining existing off-the-shelf components.

DESCRIPTION OF THE PREFERRED EMBODIMENTS OF THE INVENTION

This preferred embodiment describes using the invention in a GUI subsystem setting as an example. It in no way restricts the architecture from being utilized in other direct memory access (DMA) applications where memory is made up of data-units grouped into data-words and transfers are required involving groups of data-units not necessarily on data-word boundaries. The numbers used for memory array size, pixel depth, pixel-word length, etc. have been chosen to agree with each other; however, the architecture can easily be modified to accommodate any variation in these numbers.

Similar to the example above, a computer screen is divided into an array or grid of pixels, 1024 rows by 1024 columns. The information concerning the color/intensity for each pixel at a given time is stored in a RAM array frame buffer, 8-bits per pixel and 4 pixels per pixel-word.

Figure 1:
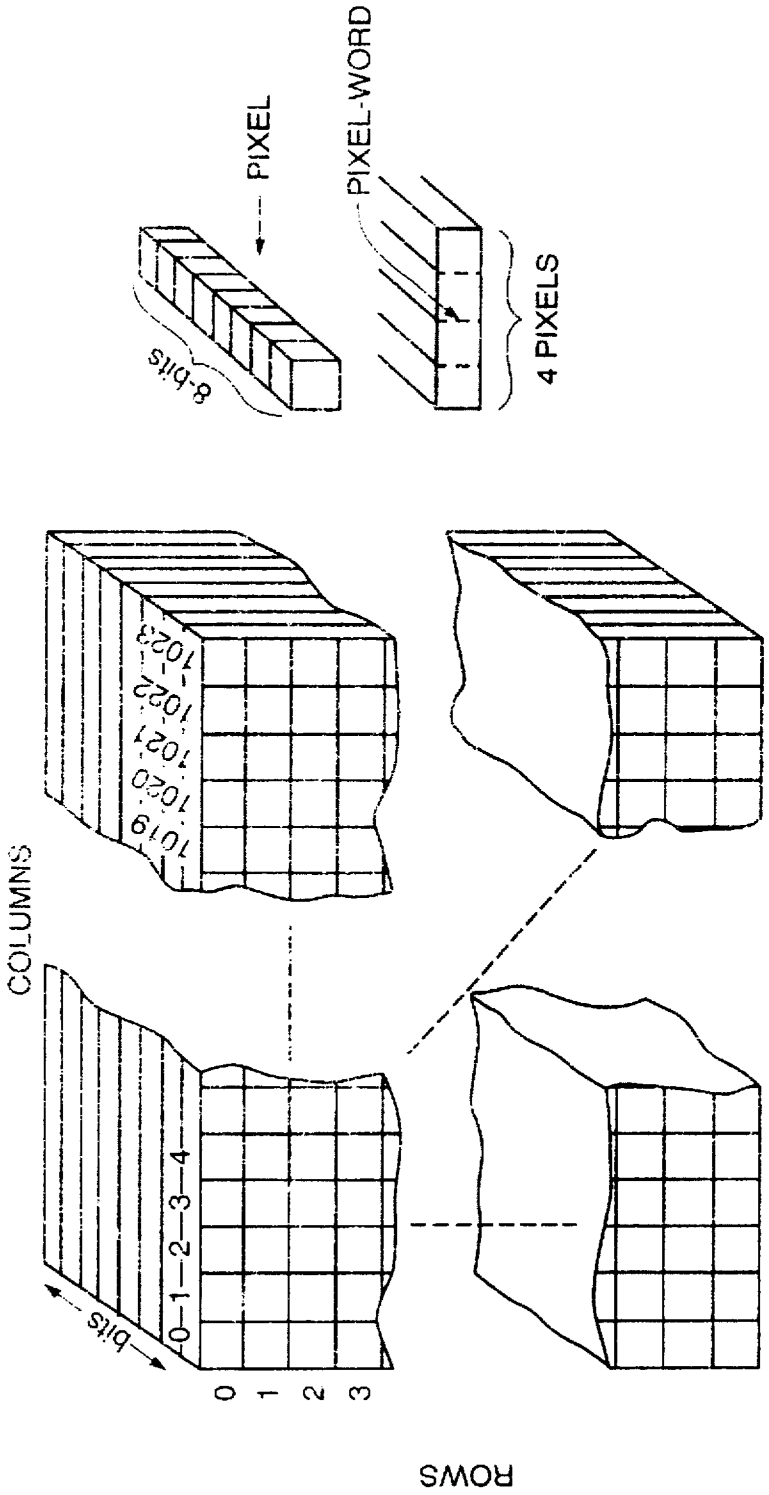
FIG. 1 is a three-dimensional diagrammatical representation of the RAM frame buffer.
Figure 2:
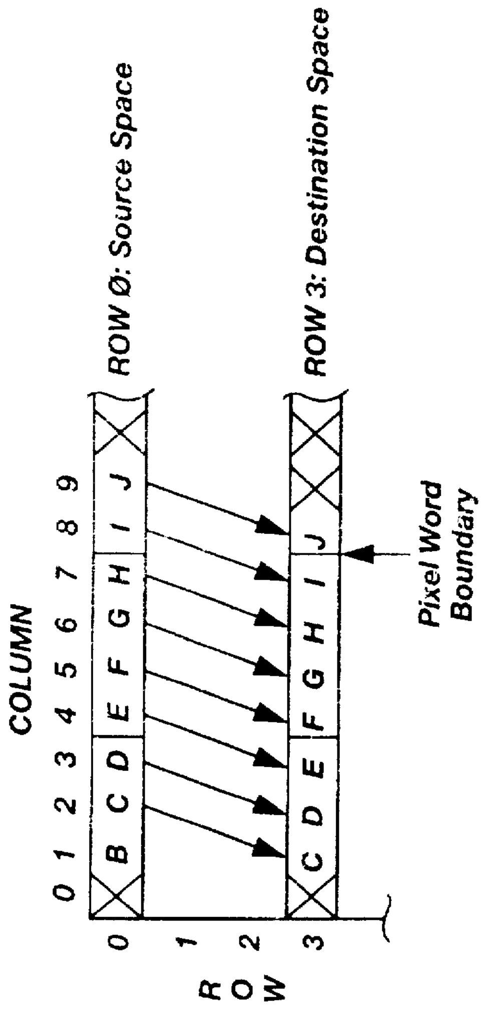
FIG. 2 is a diagram of the upper left portion of frame buffer memory showing a transfer of a row of pixels.
Figure 3:
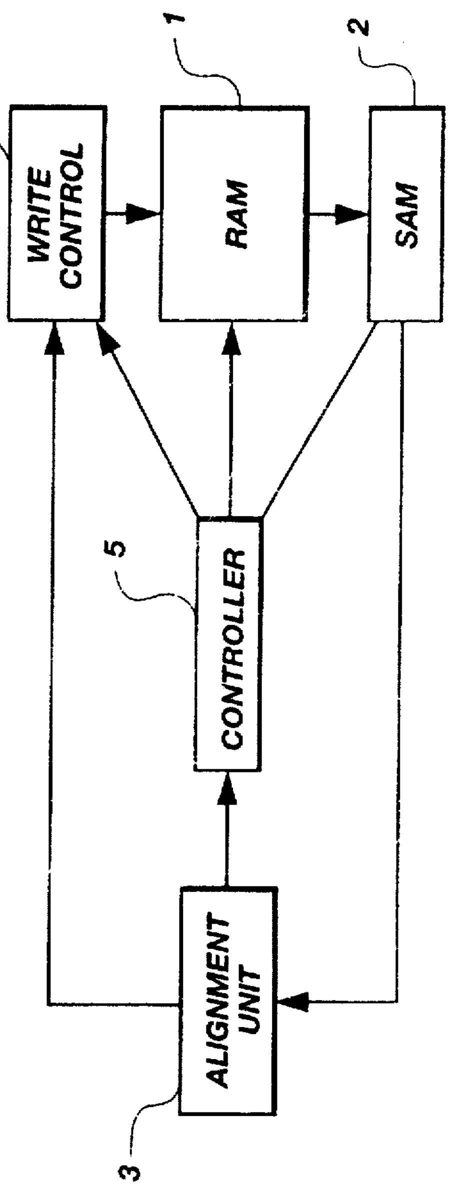
FIG. 3 is a block diagram of the data flow using the invention.

Referring now to the drawing, FIG. 3 shows a block diagram of data flow during a BitBLT. In a typical bit-block transfer (BitBLT), pixel data is read from the RAM array 1, written into a group of SAM shift registers 2 and then clocked out, word by word; through the alignment unit 3. Word by word, aligned pixel-words are written back into the RAM array through RAM write control 4 to their proper destination addresses.

The alignment unit may be designed with a pipeline register which allows the transfer to be split up into concurrently running operations. Data can be clocked out of the SAM and into the alignment unit while previously aligned data is being clocked out of the alignment unit into the RAM. Because the unit uses a pipeline register, the unit also adds one pipeline delay to the BitBLT pixel data path.

Overseeing these operations is a controller 5 which needs only the source and destination pixel addresses, the number of pixels being transferred along with the number of pixels in a pixel word to calculate and implement the proper sequence of operations to effect the transfer.

In order to calculate the alignment unit's shift, the controller compares the source and destination pixel positions. Since there are four pixels per pixel-word, the two least significant bits (LSBs) of a pixel's address are used to determine the pixel position within the pixel-word. The first three columns of Table 1 show the amount of left shift performed by the alignment unit for all possible combinations of source and destination pixel positions according to their LSB's. Once the left shift is known, the controller can generate the appropriate shift field and the alignment unit can apply it, thereby shifting the pixels from their source configuration into the destination configuration.

TABLE 1

Mask logic truth table

| Source Address LSBs | Dest. Address LSBs | Loft Shift | FIRST Count Enable | MEMORY WrEn Mask 0 1 2 3 | CYCLE SerClk Mask 0 1 2 3 | SECOND Count Enable | MEMORY WrEn Mask 0 1 2 3 | CYCLE SerClk Mask 0 1 2 3 |
|---|---|---|---|---|---|---|---|---|
| 3 | 3 | 00 | 1 | 0001 | 1111 | 1 | 1111 | 1111 |
| 3 | 2 | 01 | 0 | 0010 | 1111 | 1 | 0001 | 1000 |
| 3 | 1 | 10 | 0 | 0100 | 1111 | 1 | 0011 | 1100 |
| 3 | 0 | 11 | 0 | 1000 | 1111 | 1 | 0111 | 1110 |
| 2 | 3 | 11 | 1 | 0001 | 1110 | 1 | 1111 | 1111 |
| 2 | 2 | 00 | 1 | 0011 | 1111 | 1 | 1111 | 1111 |
| 2 | 1 | 01 | 0 | 0110 | 1111 | 1 | 0001 | 1000 |
| 2 | 0 | 10 | 0 | 1100 | 1111 | 1 | 0011 | 1100 |
| 1 | 3 | 10 | 1 | 0001 | 1100 | 1 | 1111 | 1111 |
| 1 | 2 | 11 | 1 | 0011 | 1110 | 1 | 1111 | 1111 |
| 1 | 1 | 00 | 1 | 0111 | 1111 | 1 | 1111 | 1111 |
| 1 | 0 | 01 | 0 | 1110 | 1111 | 1 | 0001 | 1000 |
| 0 | 3 | 01 | 1 | 0001 | 1000 | 1 | 1111 | 1111 |
| 0 | 2 | 10 | 1 | 0011 | 1100 | 1 | 1111 | 1111 |
| 0 | 1 | 11 | 1 | 0111 | 0111 | 1 | 1111 | 1111 |
| 0 | 0 | 00 | 1 | 1111 | 1111 | 1 | 1111 | 1111 |

If both the source and destination positions are in the same part of the pixel-word, the transfer needs no shifting, and the alignment unit simply passes the data through "as is".

Since whole pixel-words get written to memory, a write enable mask is required to prevent pixels within the addressed pixel-word but not contained in the destination space from being inadvertently changed. This pixel masking of the destination memory area is determined by the source and destination addresses and which pixel-word is being written.

A thorough study of all possible combinations of source and destination addresses and the number of pixels to be transferred reveals that a multi-stage transfer operation is required. The invention implements a BitBLT in four separate stages. The first two stages build at least the first pixel-word in destination space. The third or middle stage performs the transfer of all the full pixel-words in the middle of the block being transferred. The fourth stage performs the writing of the last pixel-word, which is sometimes partial.

All but the third stage use a write enable mask for each pixel in the pixel-word. The first two stages also require a SAM serial clock mask so that only certain pixels are clocked out of the respective SAM registers. A pixel count enable mask must also be used to keep the pixel counter and destination address column counter on track with the number of pixels transferred. These first two seemingly tedious stages are required so that the middle stage can transfer the middle pixel-words at the full bandwidth of the RAM write hardware. The values for each of these masks, based on the source and destination address LSB's and the current transfer cycle, are revealed in the remainder of Table 1.

FIGS. 4(*a*), 4(*b*), 4(*c*), and 4(*d*) show a more detailed example of our same BitBLT as broken down into these four stages. Again, the transfer of pixels C–J is to be made from their source row 0 to their destination row 3. The LSB's of the source address show position 2, and the LSB's of the destination show position 1. Using these two parameters, Table 1 gives the left shift and all the mask values needed for cycles one and two.

Since the first, second and fourth stages are one cycle long, they may be alternatively referred to as cycles. The middle stage can be many cycles.

The First Cycle The LSBs of the source and destination pixel addresses are used to form several masks that are used during the first two cycles of the BitBLT operation. As shown in the example in FIG. 4, it is sometimes necessary to mask off one or more of the left-most pixels in the first pixel word to be written into the destination address. This mask operation is implemented by deasserting the write enable during the write operation to the first pixel word in the destination.

Also illustrated in the example, there exist scenarios where the first pixel word in the destination space must actually be built from both the first and second pixel words in the source space. A counter is used to generate the column portion of the destination address during a BitBLT. If the first two pixel words in the source are required to build the first pixel word in the destination space, then the column and pixel counter must be the same during the first two cycles. The Count Enable field in Table 1 indicates what scenarios cause this to happen.

Figure 4A:
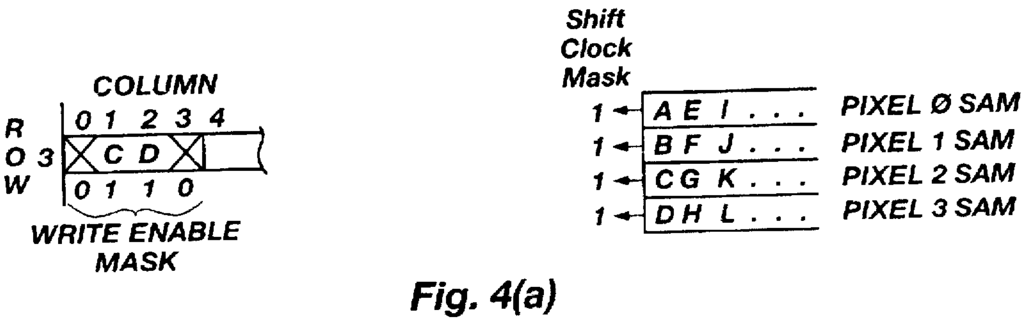
FIGS. 4(*a*), 4(*b*), 4(*c*), and 4(*d*) shows a step by step example of a BitBLT using the invention.

It is preferable to write full pixel-words during the middle cycles. A mask is applied to the serial clocks for the SAM registers to keep the controller from having to build each pixel word in the destination space similar to the first two cycles of the BitBLT. By correctly masking the serial clocks, the column pointers for each pixel within the pixel word are set so that during the middle cycles, the correct pixels are identified and all pixels can be clocked simultaneously for the remainder of the transfer operation. Table 1 indicates the serial clock mask operation during the first two cycles for each of the address scenarios. FIG. 4*a* shows the state of the destination space and the SAM registers after the first cycle.

Figure 4B:
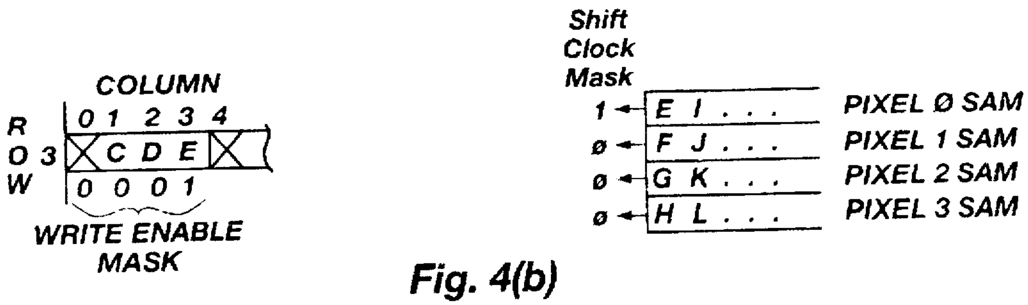

The Second Cycle of the BitBLT operation is similar to the first cycle. The controller masks write-enable and serial-clock for each pixel based on the source and destination address LSBs. The column and pixel counter is allowed to advance in all cases because at the end of the second cycle, at least the first pixel word of the destination space has been transferred. Second cycle operation is the same as the first cycle. FIG. 4*b* shows how both the write enable and shift clock masks are used to complete the update of the first pixel word in the destination space and set up the SAM registers for the middle cycles.

Figure 4C:
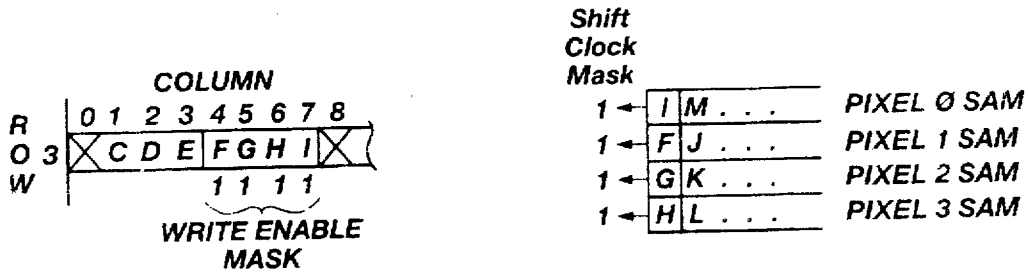

The Middle Cycle The first two cycles of the BitBLT handle all of the masking required to write at least the first pixel word and align the SAM pointers for each pixel within the pixel word so that during the middle cycles no masking is required and the controller can transfer pixels at the full bandwidth of the RAM write circuitry. For each remaining pixel-word, the SAM registers are clocked, the pixel word is output and subsequently aligned, and then written into the RAM array at the destination address. This continues until the pixel counter has counted down to one, where the ending cycle begins. FIG. 4*c* shows a typical middle cycle. Note how the alignment value affects the pixel position within the destination space.

Figure 4D:
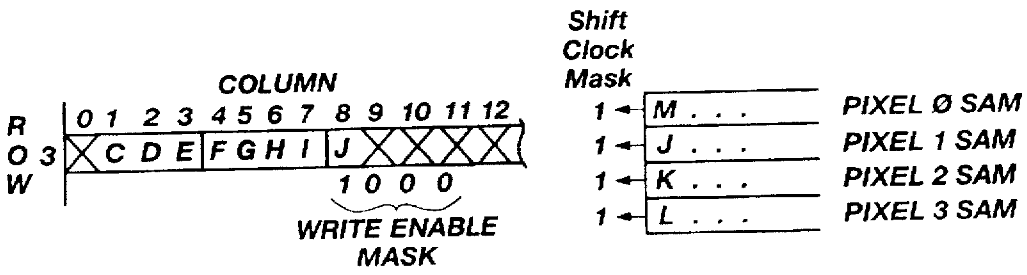

The Ending Cycle Depending on the destination address and the number of pixels being transferred, a write-enable mask is sometimes required to correctly transfer the last pixel word into the destination space. When the pixel word counter has counted down to a value of one, the destination address LSBs and pixel count LSBs are evaluated to determine how many transfer cycles are required to complete the BitBLT operation and what the write-enable mask should be for the last pixel word. Table 2 lists the possible scenarios. FIG. 4*d* shows how the write enable mask is used.

TABLE 2

Ending cycle write enable mask truth table

| Destination LSBs | Number Pixels MOD 4 | REMAINING PIXEL-WORD COUNT | Ending Write Enable Mask 0123 |
|---|---|---|---|
| 0 0 | 0 | 1 | 1 1 1 1 |
| 0 1 | 0 | 2 | 1 0 0 0 |
| 1 0 | 0 | 2 | 1 1 0 0 |
| 1 1 | 0 | 2 | 1 1 1 0 |
| 0 0 | 1 | 2 | 1 0 0 0 |
| 0 1 | 1 | 2 | 1 1 0 0 |
| 1 0 | 1 | 2 | 1 1 1 0 |
| 1 1 | 1 | 2 | 1 1 1 1 |
| 0 0 | 2 | 2 | 1 1 0 0 |
| 0 1 | 2 | 2 | 1 1 1 0 |
| 1 0 | 2 | 2 | 1 1 1 1 |
| 1 1 | 2 | 3 | 1 0 0 0 |
| 0 0 | 3 | 2 | 1 1 1 0 |
| 0 1 | 3 | 2 | 1 1 1 1 |
| 1 0 | 3 | 3 | 1 0 0 0 |
| 1 1 | 3 | 3 | 1 1 0 0 |

Figure 5:
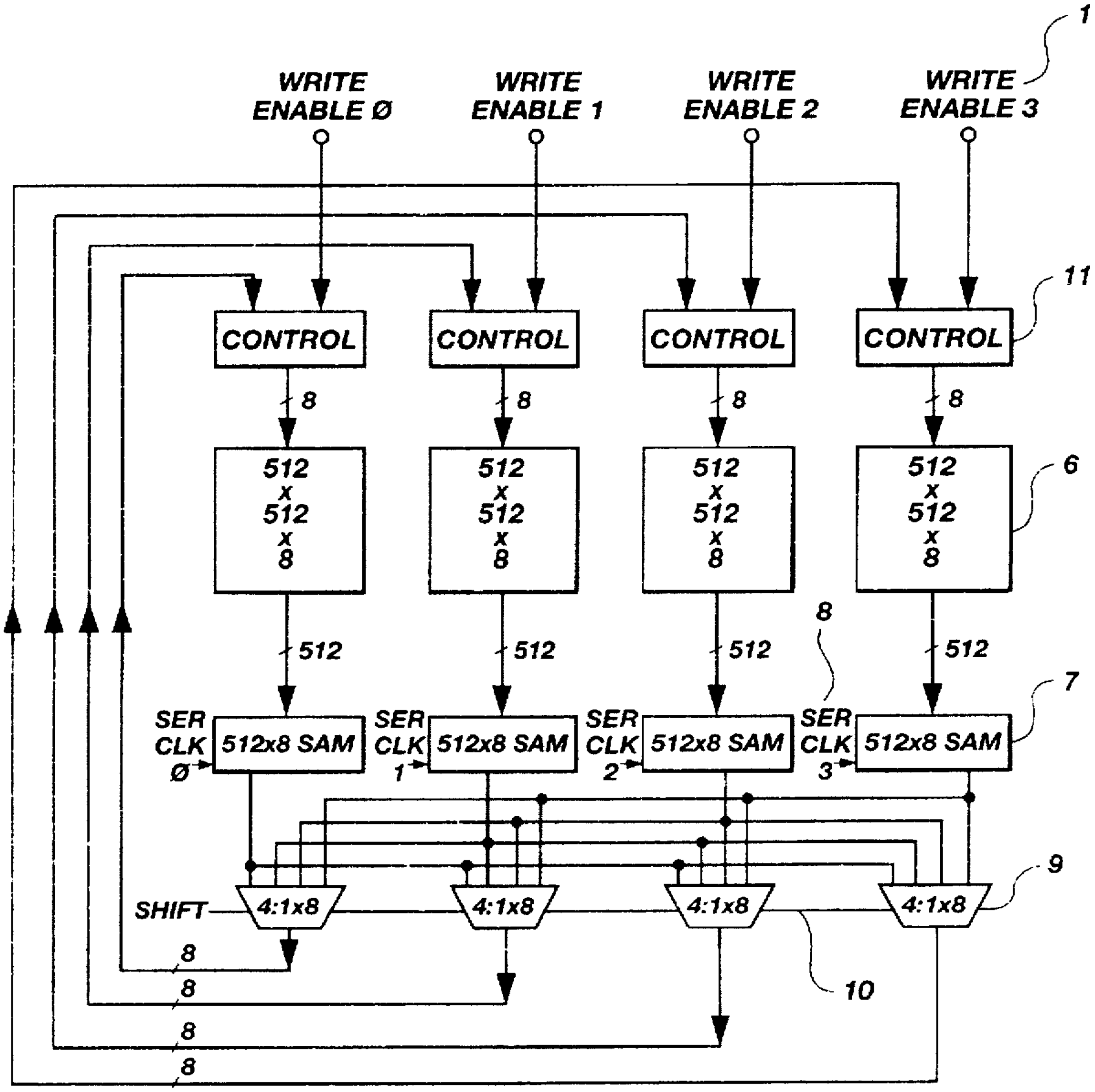
FIG. 5 is a detailed block diagram of the data path architecture.

FIG. 5 shows a typical pixel data path architecture for this example which uses the above described BitBLT procedure. A one-megabyte RAM array 6 is represented as four arrays of 512×512×8 bits, each representing memory for a particular pixel position. To each of these memory arrays is connected a 512×8 SAM shift register 7 which gets loaded with a row of pixels during a BitBLT. A serial clock 8 tells each SAM when to clock out its pixel. The four eight-bit wide 4:1 multiplexers 9 act as a pixel rotation unit, thereby implementing the alignment unit. A two-bit shift field 10 based on the source and destination address LSB's and specified in table 1 indicates what rotation of the pixel word is required to meet the alignment requirements going into the RAM write circuitry 11. The write enable 12 for each pixel position determines whether the pixel entering that position from the alignment unit 9 gets written to memory 6.

Figure 6:
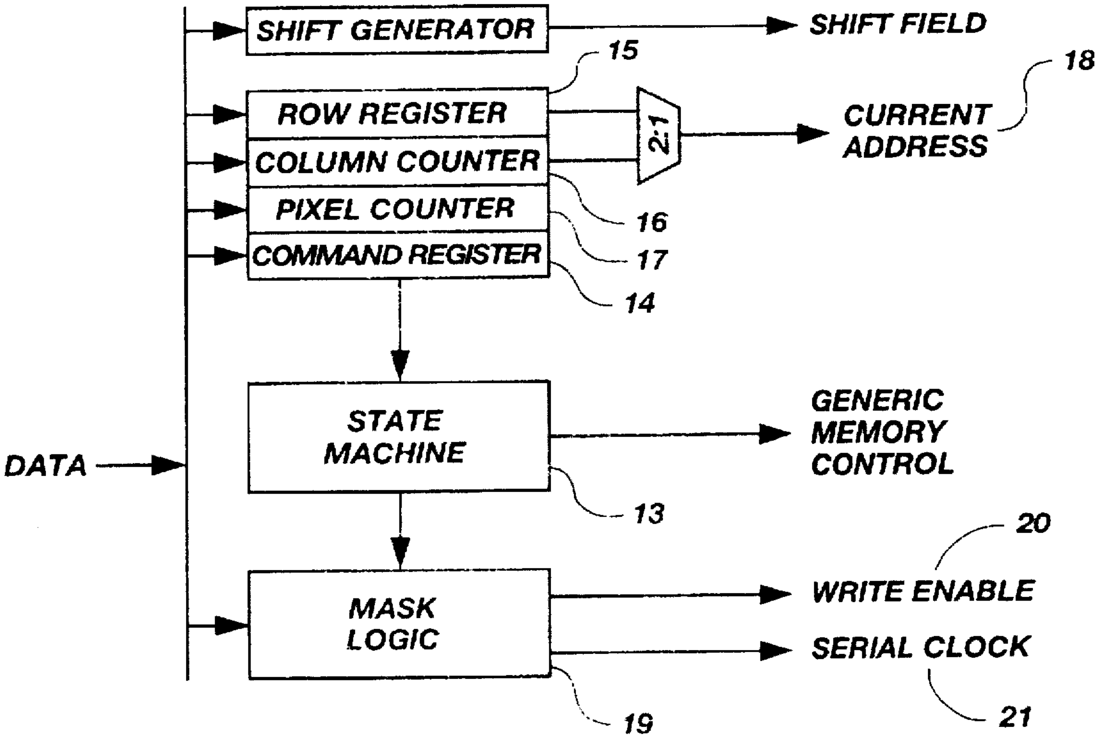
FIG. 6 is a block diagram of a generic controller required in the invention.

In order to implement these operations, the controller needs to generate the proper signals, clocks and masks at the proper times as required by the other circuitry. FIG. 6 shows a block diagram of a generic controller built around our GUI example.

The controller is centered around a state machine 13 which generates control for each cycle of the transfer. It uses the command register 14 to specify the type of control cycle desired. It also uses the row register 15 to keep track of the destination row, the column counter 16 to generate and keep track of the current destination column address for writing to RAM, and the pixel counter 17 to know the point to which the transfer has progressed. The row register and column counter together form the destination address 18. The state machine generates the write enables 20 and serial clocks 21 for each pixel in the pixel word, applying the appropriate masking based on the mask generation circuitry 19.

The controller can be implemented as a memory mapped device for purposes of control by a system processor, but could receive communication through a number of means depending on the graphic subsystem design. In other words, control of the controller can be accomplished through many means available in the art, but the invention lies in how the controller guides BitBLT's.

Figure 7:
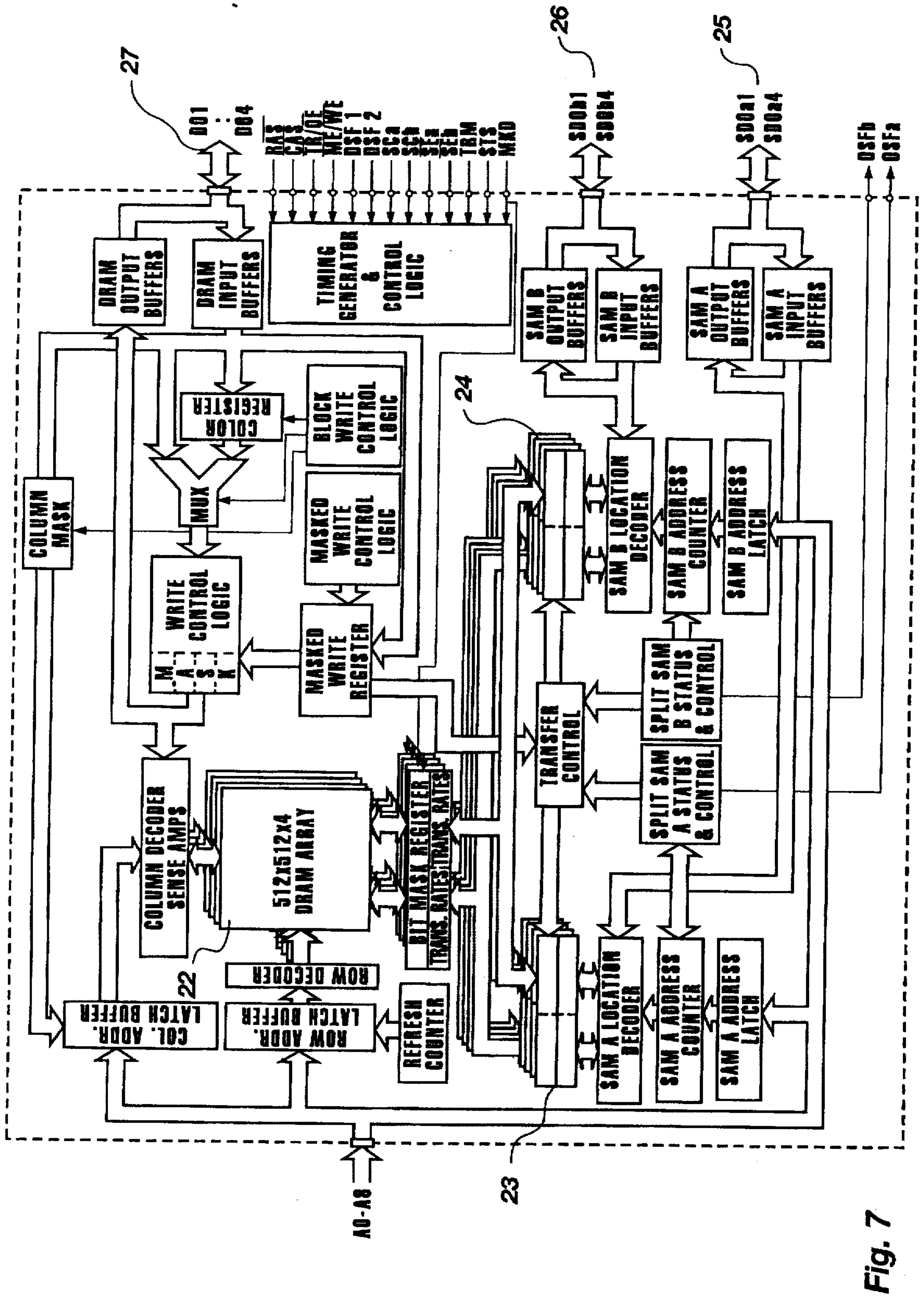
FIG. 7 is a detailed block diagram of a TPDRAM assembly.

A specific implementation of the invention can be realized using existing hardware in the form of the Micron Triple-Ported Dynamic RAM (TPDRAM). The inherent capabilities of TPDRAM make it uniquely suited to this application. As seen in FIG. 7, the TPDRAM has an onboard 512×512×4 DRAM array 22 which is connected to two 512×4 SAM's, SAMa 23 and SAMb 24 which are connected, respectively, to two serial ports 25 and 26. Additionally, the TPDRAM has a bi-directional random access port 27. Eight TPDRAM devices are combined in parallel to form the necessary 512×512×32 frame buffer memory.

Figure 8:
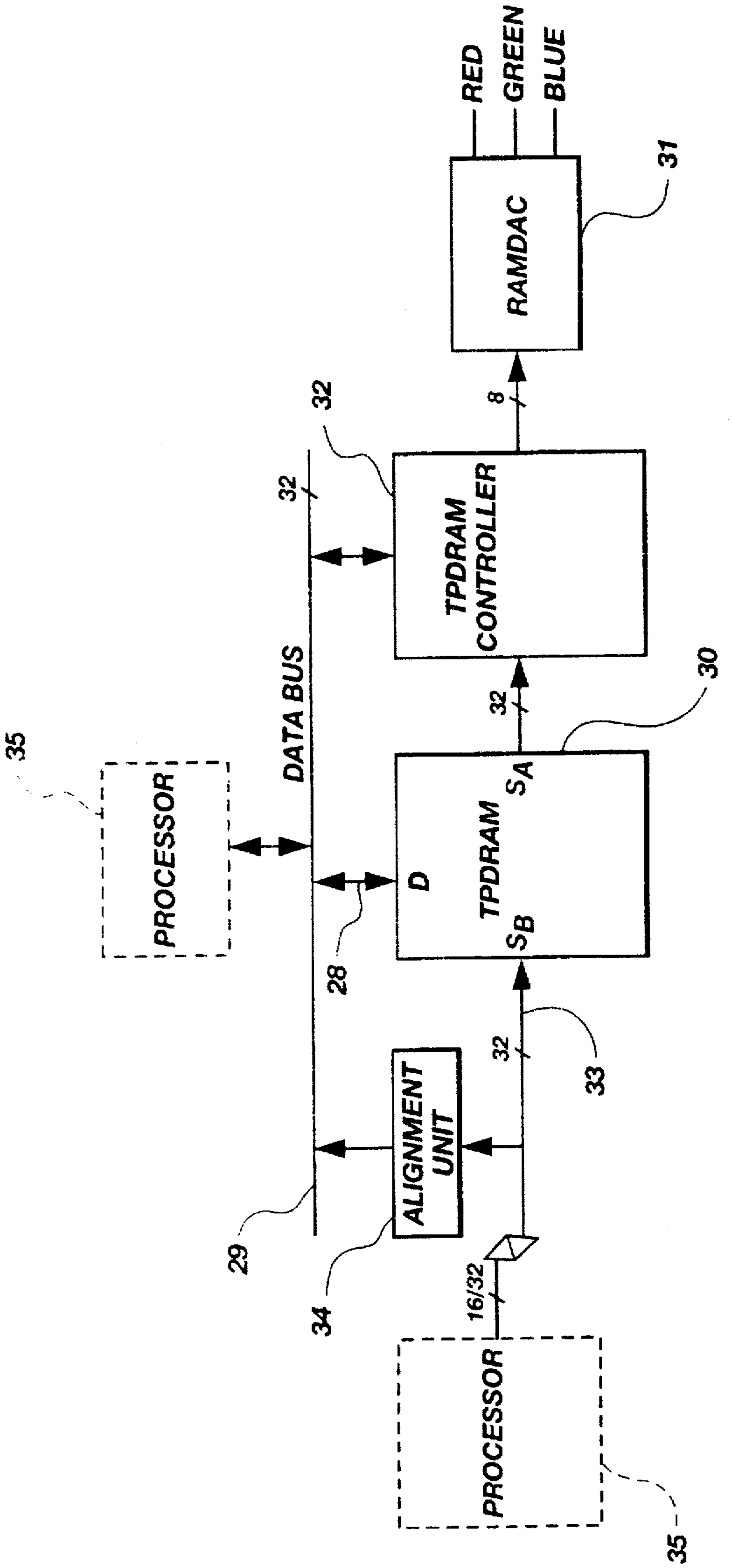
FIG. 8 is a system block diagram utilizing a TPDRAM as a GUI frame buffer.

FIG. 8 shows the TPDRAM implemented within a GUI subsystem. Here, the TPDRAM's random port 28 is connected to a system data bus 29. SAMa 30 is devoted exclusively to supplying a stream of pixel data to the video display circuitry 31 via the TPDRAM controller 32.

SAMb 33 is used as the SAM registers during BitBLT's. Pixel data can be clocked out of SAMb by the controller into an outboard alignment unit 34, then returned to the DRAM array via the random port 28 for direct writing to the DRAM array.

Since it is typically part of a larger system, the subsystem may have connections to processor 35 which can connect to the TPDRAM through either the serial or random port.

Figure 9:
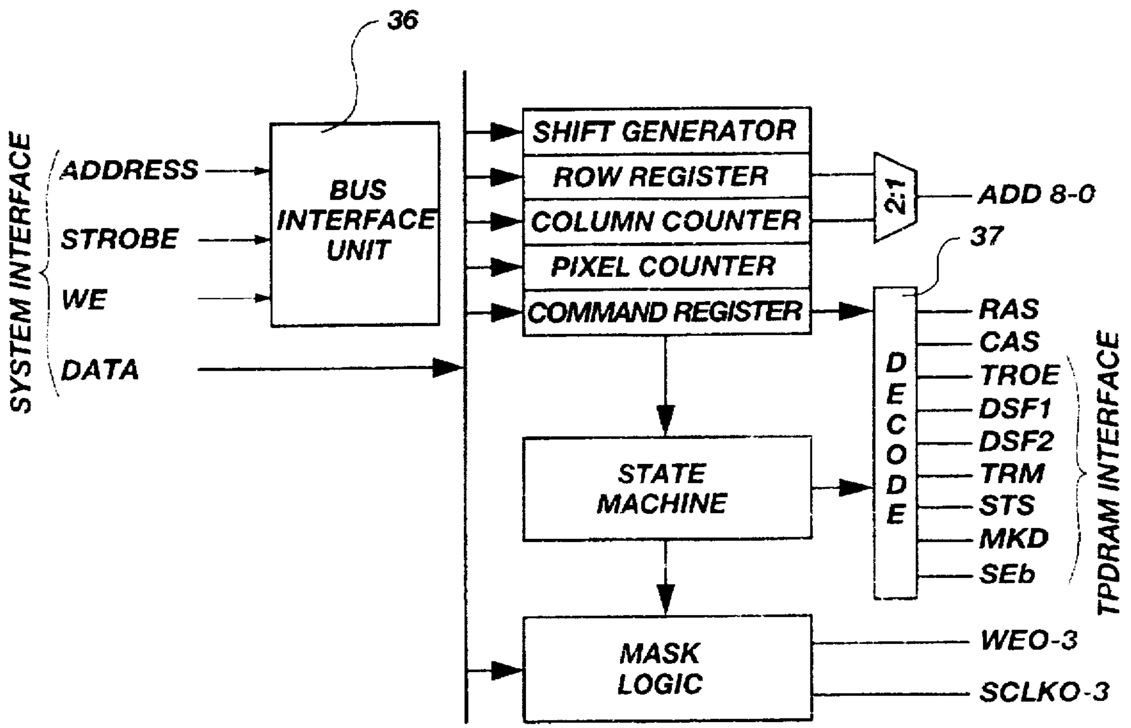
FIG. 9 is a block diagram of the controller which implements the TPDRAM.

Turning to FIG. 9, the controller described earlier has been slightly modified to interface with the requirements of the TPDRAM. Most notable are the data bus interface unit 36 and the TPDRAM interface decode unit 37 which generates signals required to operate the TPDRAM.

Figure 10:
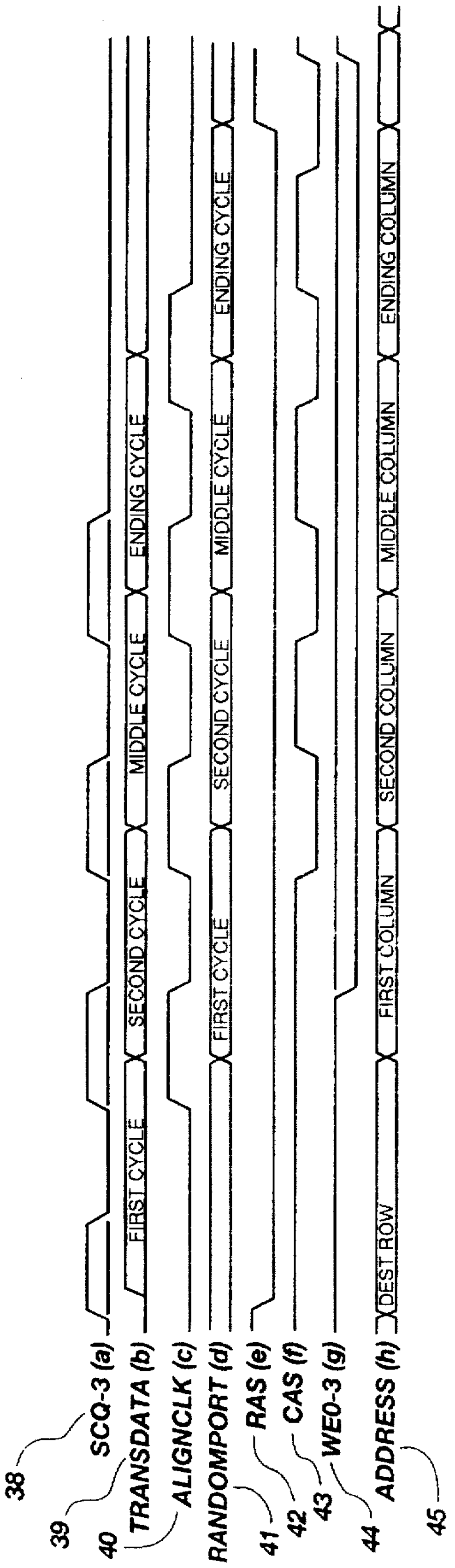
FIG. 10 is a timing diagram of the signals on selected lines during a BitBLT.

FIG. 10 shows the signals appearing on selected lines of the controller and TPDRAM during a typical BitBLT. These include:

- the serial clocks 38 which, of course, is subject to masking on the first two transfer cycles,
- data coming out of SAMb 39,
- an alignment clock 40 used to register data into the alignment unit,
- data coming out of the alignment unit and into the random port 41,
- the row address strobe (RAS) 42 which opens the destination row in the TPDRAM for writing,
- the column address strobe (CAS) 43 which specifies the destination column address of each pixel-word written (note that the write begins when CAS falls, the destination address is present and the aligned pixel-word is present at the inputs of the random port),
- the write enables coming into the random port 44 which are subject to masking on all but the middle cycles, and
- the address 45 coming from the row and column register.

Pseudo-code commands from the processor to the controller to accomplish the BitBLT in our example might look like this:

```
LOAD SAMb (source X=2, source Y=0)
WAIT FOR COMPLETION
TRANSFER PIXELS (destination X=1, destination Y=3,
        # of pixels=8)
WAIT FOR COMPLETION
```

The command LOAD SAMb transfers the entire row from the left-most pixel address of the source specified by (X=2, Y=0) in the DRAM array into SAMb and sets the SAMb column pointer to the left most pixel in source space.

Since commands to the TPDRAM cannot be queued up, the controller must WAIT FOR COMPLETION of the SAM transfer in order to know when to initiate the next command.

The TRANSFER PIXELS command causes the controller to clock the pixels out of the SAMb registers, through the alignment unit and into the random port, beginning at the destination address specified by (destination X=1, destination Y=3) for # of pixels=8.

Every time the screen is refreshed (typically 72 times a second), the memory controller must read from the frame buffer the values for all the pixels being displayed. Also, due usually to the physics of memory cell construction, DRAM arrays must be regularly refreshed (DRAM refresh) to retain information in seldom accessed memory. Both of these operations take precedence and can interrupt a BitBLT. Afterwards, the controller is able to restart the transfer where it left off.

In this embodiment, BitBLT's involving more than one row of data require successive single row BitBLT operations on successive rows. However, the circuitry could be easily enhanced by adding an outer control loop which performs BitBLTs of multiple rows of multiple columns of pixels. This would require converting the row register in the controller to be a counter that increments at the completion of each row BitBLT and uses a separate pixel row counter that decrements to zero as each row is transferred.

In addition to BitBLT's, the SAM ports also perform page mode transfers at twice the speed of the random port. This mode is useful for high bandwidth asynchronous data transfers such as pattern fill operations. These types of transfers are handled in a Bi-directional manner with both read and write operations occurring through SAM.

The TPDRAM also offers memory cycles that allow powerful macro-level routines that can operate on one or two display lines simultaneously, thereby giving the graphics programmer added control and functionality.

While the preferred embodiments of the invention have been described, modifications can be made and other embodiments may be devised without departing from the spirit of the invention and the scope of the appended claims.

What is claimed is:

1. A memory system comprising:

a memory array for storing a plurality of data unit groups, each data unit group comprising one or more data units, each data unit having a relative position within its data unit group and comprising one or more data bits;

an array reader coupled to the memory array for selectively reading data unit groups from a source area therein, the array reader including a masking circuit for read-filtering the selectively-read data unit groups by masking data units at selected relative positions therein;

a data aligner coupled to the array reader for aligning the read-filtered data unit groups with a destination area in the memory array by selectively shifting the relative positions of data units in the read-filtered data unit groups; and an array writer coupled to the data aligner and the memory array for write-filtering the aligned data unit groups by masking data units at selected relative positions therein and for writing the write-filtered data unit groups to the destination area in the memory array, whereby the memory system may effect a data transfer between the source and destination areas in the memory array.

2. The memory system of claim 1 wherein the data units comprise pixels and the data unit groups comprise pixel words.

3. The memory system of claim 1 wherein the memory array comprises a Dynamic Random Access Memory (DRAM).

4. The memory system of claim 3 wherein the memory array comprises a Triple-Ported Dynamic Random Access Memory (TPDRAM).

5. The memory system of claim 1 wherein the array reader comprises a Serial Access Memory (SAM) for storing the selectively read data unit groups, wherein the array reader's masking circuit read-filters data unit groups stored in the SAM by generating a serial clock mask directing the SAM to retain data units having selected relative positions within their data unit groups and to clock out data units having non-selected relative positions within their data unit groups.

6. The memory system of claim 1 wherein the data aligner comprises a plurality of multiplexers (MUX's).

7. The memory system of claim 1 wherein the data aligner includes a pipeline register for outputting aligned data unit groups to the array writer and aligning subsequent read-filtered data unit groups received from the array reader at substantially the same time.

8. The memory system of claim 1 wherein the array writer comprises:

a write circuit for receiving the aligned data unit groups and writing to the memory array; and a write control logic circuit coupled to the write circuit for write-filtering the aligned data unit groups by generating a write enable mask directing the write circuit to retain data units having selected relative positions within their aligned data unit groups and to write data units having non-selected relative positions within their aligned data unit groups to the memory array.

9. The memory system of claim 1 wherein the memory array, array reader, data aligner, and array writer are all implemented on a single die.

10. The memory system of claim 1 further comprising a controller coupled to the memory array, array reader, data aligner, and array writer for selecting the data unit groups to be read from the source area in the memory array, selecting the data units to be masked in order to read-filter the selectively-read data unit groups, selecting the shift in relative positions of data units within the read-filtered data unit groups in order to align the read-filtered data unit groups with the destination area in the memory array, and selecting the data units to be masked in order to write-filter the aligned data unit groups.

11. An integrated circuit die comprising:

a memory array for storing a plurality of data unit groups, each data unit group comprising one or more data units, each data unit having a relative position within its data unit group and comprising one or more data bits;

an array reader coupled to the memory array for selectively reading data unit groups from a source area therein, the array reader including a masking circuit for read-filtering the selectively-read data unit groups by masking data units at selected relative positions therein;

a data aligner coupled to the array reader for aligning the read-filtered data unit groups with a destination area in the memory array by selectively shifting the relative positions of data units in the read-filtered data unit groups; and an array writer coupled to the data aligner and the memory array for write-filtering the aligned data unit groups by masking data units at selected relative positions therein and for writing the write-filtered data unit groups to the destination area in the memory array, whereby the integrated circuit die may effect a data transfer between the source and destination areas in the memory array.

12. The integrated circuit die of claim 11 wherein the array reader comprises a Serial Access Memory (SAM) for storing the selectively read data unit groups, wherein the array reader's masking circuit read-filters data unit groups stored in the SAM by generating a serial clock mask directing the SAM to retain data units having selected relative positions within their data unit groups and to clock out data units having non-selected relative positions within their data unit groups.

13. The integrated circuit die of claim 11 wherein the data aligner comprises a plurality of multiplexers (MUX's).

14. The integrated circuit die of claim 11 wherein the data aligner includes a pipeline register for outputting aligned data unit groups to the array writer and aligning subsequent read-filtered data unit groups received from the array reader at substantially the same time.

15. The integrated circuit die of claim 11 wherein the array writer comprises:

a write circuit for receiving the aligned data unit groups and writing to the memory array; and a write control logic circuit coupled to the write circuit for write-filtering the aligned data unit groups by generating a write enable mask directing the write circuit to retain data units having selected relative positions within their aligned data unit groups and to write data units having non-selected relative positions within their aligned data unit groups to the memory array.

16. The integrated circuit die of claim 11 further comprising a controller coupled to the memory array, array reader, data aligner, and array writer for selecting the data unit groups to be read from the source area in the memory array, selecting the data units to be masked in order to read-filter the selectively-read data unit groups, selecting the shift in relative positions of data units within the read-filtered data unit groups in order to align the read-filtered data unit groups with the destination area in the memory array, and selecting the data units to be masked in order to write-filter the aligned data unit groups.

17. An electronic system comprising:

an input device;

an output device;

a processor coupled to the input and output devices; and a memory device coupled to the processor, the memory device comprising:

a memory array for storing a plurality of data unit groups, each data unit group comprising one or more data units, each data unit having a relative position within its data unit group and comprising one or more data bits;

an array reader coupled to the memory array for selectively reading data unit groups from a source area therein, the array reader including a masking circuit for read-filtering the selectively-read data unit groups by masking data units at selected relative positions therein;

a data aligner coupled to the array reader for aligning the read-filtered data unit groups with a destination area in the memory array by selectively shifting the relative positions of data units in the read-filtered data unit groups; and an array writer coupled to the data aligner and the memory array for write-filtering the aligned data unit groups by masking data units at selected relative positions therein and for writing the write-filtered data unit groups to the destination area in the memory array, whereby the memory device may effect a data transfer between the source and destination areas in the memory array.

18. The electronic system of claim 17 wherein the array reader comprises a Serial Access Memory (SAM) for storing the selectively read data unit groups, wherein the array reader's masking circuit read-filters data unit groups stored in the SAM by generating a serial clock mask directing the SAM to retain data units having selected relative positions within their data unit groups and to clock out data units having non-selected relative positions within their data unit groups.

19. The electronic system of claim 17 wherein the data aligner comprises a plurality of multiplexers (MUX's).

20. The electronic system of claim 17 wherein the data aligner includes a pipeline register for outputting aligned data unit groups to the array writer and aligning subsequent read-filtered data unit groups received from the array reader at substantially the same time.

21. The electronic system of claim 17 wherein the array writer comprises:

a write circuit for receiving the aligned data unit groups and writing to the memory array; and a write control logic circuit coupled to the write circuit for write-filtering the aligned data unit groups by generating a write enable mask directing the write circuit to retain data units having selected relative positions within their aligned data unit groups and to write data units having non-selected relative positions within their aligned data unit groups to the memory array.

22. The electronic system of claim 17 further comprising a controller coupled to the memory array, array reader, data aligner, and array writer for selecting the data unit groups to be read from the source area in the memory array, selecting the data units to be masked in order to read-filter the selectively-read data unit groups, selecting the shift in relative positions of data units within the read-filtered data unit groups in order to align the read-filtered data unit groups with the destination area in the memory array, and selecting the data units to be masked in order to write-filter the aligned data unit groups.

23. A graphical electronic system comprising:

a video memory array for storing a plurality of pixel words, each pixel word comprising one or more pixels, each pixel having a relative position within its pixel word and comprising one or more data bits;

an array reader coupled to the video memory array for selectively reading pixel words from a source area therein, the array reader including a masking circuit for read-filtering the selectively-read pixel words by masking pixels at selected relative positions therein;

a pixel aligner coupled to the array reader for aligning the read-filtered pixel words with a destination area in the video memory array by selectively shifting the relative positions of pixels in the read-filtered pixel words;

an array writer coupled to the pixel aligner and the video memory array for write-filtering the aligned pixel words by masking pixels at selected relative positions therein and for writing the write-filtered pixel words to the destination area in the video memory array, whereby the graphical electronic system may effect a Bit-Block Transfer (BitBIT) between the source and destination areas in the video memory array; and a video output device coupled to the video memory array for displaying images represented by pixels stored therein.

24. The graphical electronic system of claim 23 wherein the video memory array comprises a Dynamic Random Access Memory (DRAM).

25. The graphical electronic system of claim 24 wherein the video memory array comprises a Triple-Ported Dynamic Random Access Memory (TPDRAM).

26. The graphical electronic system of claim 23 wherein the array reader comprises a Serial Access Memory (SAM) for storing the selectively read pixel words, wherein the array reader's masking circuit read-filters pixel words stored in the SAM by generating a serial clock mask directing the SAM to retain pixels having selected relative positions within their pixel words and to clock out pixels having non-selected relative positions within their pixel words.

27. The graphical electronic system of claim 23 wherein the pixel aligner comprises a plurality of multiplexers (MUX's).

28. The graphical electronic system of claim 23 wherein the pixel aligner includes a pipeline register for outputting aligned pixel words to the array writer and aligning subsequent read-filtered pixel words received from the array reader at substantially the same time.

29. The graphical electronic system of claim 23 wherein the array writer comprises:

a write circuit for receiving the aligned pixel words and writing to the video memory array; and a write control logic circuit coupled to the write circuit for write-filtering the aligned pixel words by generating a write enable mask directing the write circuit to retain pixels having selected relative positions within their aligned pixel words and to write pixels having non-selected relative positions within their aligned pixel words to the video memory array.

30. The graphical electronic system of claim 23 further comprising a controller coupled to the video memory array, array reader, pixel aligner, and array writer for selecting the pixel words to be read from the source area in the video memory array, selecting the pixels to be masked in order to read-filter the selectively-read pixel words, selecting the shift in relative positions of pixels within the read-filtered pixel words in order to align the read-filtered pixel words with the destination area in the video memory array, and selecting the pixels to be masked in order to write-filter the aligned pixel words.

31. A method of performing a data transfer in a memory array, the method comprising:

storing a plurality of data unit groups in a source area in the memory array, each data unit group comprising one or more data units, each data unit having a relative position within its data unit group and comprising one or more data bits;

reading the data unit groups from the source area in the memory array;

read-filtering the data unit groups by selectively masking data units at relative positions therein;

aligning the data unit groups with a destination area in the memory array by selectively shifting the relative positions of the data units in the data unit groups;

write-filtering the aligned data unit groups by selectively masking data units at relative positions therein; and writing the data unit groups to the destination area in the memory array, thereby effecting a data transfer between the source and destination areas in the memory array.

32. The method of claim 31 wherein the step of read-filtering the data unit groups includes storing the data unit groups in a Serial Access Memory (SAM) and generating a serial clock mask directing the SAM to retain data units having selected relative positions within their data unit groups and to clock out data units having non-selected relative positions within their data unit groups.

* * * * *

UNITED STATES PATENT AND TRADEMARK OFFICE

CERTIFICATE OF CORRECTION

PATENT NO. : 5,737,761

DATED : April 7, 1998

INVENTOR(S) : Holland et al.

It is certified that error appears in the above-identified patent and that said Letters Patent is hereby corrected as shown below:

Add U.S. Patent Documents made of record as follows:

| | | |
|---|---|---|
| --4,891,794 | 01/02/90 | Hush et al.-- |
| --5,036,475 | 07/30/91 | Ueda-- |
| --5,202,962 | 04/13/93 | Matsuo et al.-- |
| --5,218,674 | 06/08/93 | Peaslee et al.-- |
| --5,265,204 | 11/23/93 | Kimura et al.--. |

Signed and Sealed this

Twenty-sixth Day of January, 1999

*Attest:*

*Attesting Officer*

*Acting Commissioner of Patents and Trademarks*